United States Patent [19]

Halpern et al.

[11] 4,342,682
[45] Aug. 3, 1982

[54] INTUMESCENT FLAME RETARDANT THERMOPLASTIC POLYURETHANE ELASTOMER COMPOSITIONS

[75] Inventors: Yuval Halpern, Skokie; Donald D. Hall, Jr., Prospect Heights, both of Ill.

[73] Assignee: Borg-Warner Chemicals, Inc., Parkersburg, W. Va.

[21] Appl. No.: 303,688

[22] Filed: Sep. 18, 1981

[51] Int. Cl.$^3$ ............................................... C08K 5/52
[52] U.S. Cl. ........................... 523/179; 260/DIG. 24; 521/107; 521/165; 521/906; 521/907; 524/100; 524/120; 524/590; 524/377

[58] Field of Search ............... 260/45.8 NT, 45.8 NE, 260/DIG. 24; 521/107, 165, 906, 907

[56] References Cited

U.S. PATENT DOCUMENTS 4,201,705 5/1980 Halpern ...................... 260/45.8 NT Primary Examiner—Morton Foelak
Attorney, Agent, or Firm—Richard J. Schlott

[57] ABSTRACT

Thermoplastic polyurethane elastomer compositions comprising a polyurethane elastomer, a pentate salt of an amino-s-triazine, and optionally a polyol are flame retardant and intumescent and may be compounded to be self-extinguishing.

5 Claims, No Drawings

INTUMESCENT FLAME RETARDANT THERMOPLASTIC POLYURETHANE ELASTOMER COMPOSITIONS

BACKGROUND OF THE INVENTION

This invention relates to flame retardant polyurethane elastomer compositions. More particularly, this invention relates to flame retardant thermoplastic polyurethane elastomer compositions comprising a thermoplastic polyurethane elastomer and a flame retarding amount of the pentate salt of an amino-s-triazine and to a method for rendering thermoplastic polyurethane elastomers flame retardant.

Urethane resin compositions have long been known. The chemistry of these resin systems is well-understood and has been used to provide a wide variety of materials including urethane coatings, foam structures, urethane casting resins and thermoplastic urethane elastomers. Urethane foams have been widely employed in insulation, seating, upholstery, crash pads, as fabric liners and the like. Thermoplastic urethane elastomers, unlike most crosslinked rubbery materials, are readily processible by blow-molding and in extrusion and injection molding equipment. Because of unusual toughness and oil and abrasion resistance, thermoplastic urethane elastomers have found use in such diverse applications as automotive fender extensions and bumpers, roller skate wheels and horseshoes. Urethane resins are, however, generally regarded as flammable, ranging from rapid burning unmodified foam structures to slow-burning molded goods. Urethane elastomers also tend to degrade during burning to produce very low viscosity molten materials which tend to drip badly and spread the fire through flaming droplets. The use of flame retardants in urethane compositions is therefore indicated where flame retardant properties are required.

Flame retarded polyurethane elastomer compositions containing halogen compounds or phosphorus compounds which exhibit self-extinguishing, UL V-O characteristics are known. For some applications, however, the use of halogen- or phosphorus-based additive flame retardants is not desirable. Some phosphorus compounds, for example, tend to plasticize polymers and alter the physical properties. Similarly, halogen-based flame retardants, whether used alone or in conjunction with synergists such as antimony oxides may alter key physical properties of the resin and limit the potential enduses. An alternative flame retardant for use in these resins would thus broaden the choices available to the resin compounder for meeting the demands of the market.

SUMMARY OF THE INVENTION

The pentate salts of amino-s-triazines are effective intumescent flame retardant additives for thermoplastic polyurethane elastomers providing compositions that are self-extinguishing, intumescent and non-dripping. The additives are dry, white, powdery solids and are readily compounded with polyurethanes to provide compositions which have excellent color and which are readily processed without apparent foaming or decomposition during molding.

DETAILED DESCRIPTION OF THE INVENTION

The flame retardant polyurethane elastomer compositions of this invention comprise a thermoplastic polyurethane elastomer and a flame retarding amount of a pentate salt of an amino-s-triazine.

The polyurethane elastomers useful for the purposes of this invention include any of the widely available thermoplastic urethane elastomer resins. These resins are linear, thermoplastic polymers containing alternating hard and soft segments and crosslinked through thermally-reversible linkages. Wide property variations may thus be selectively accomplished by varying the proportion of hard and soft segments in the polymer chain to give materials ranging from soft, tough rubbers to hard and rigid plastics. These resins, which the industry has termed elastoplastics, are readily available commercially in pre-compounded and pelletized form and in general all will be useful in forming the flame retardant intumescent compositions of this invention.

The pentate salts of amino-s-triazines useful for the purposes of this invention are pentaerythritol diphosphate salts (pentates) having the following structure:

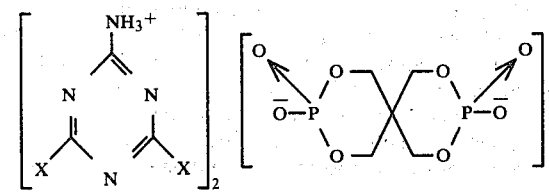

wherein x may be —NH$_2$ or —OH, and include melammonium pentate, (x=—NH$_2$), the pentate salt of ammelide (x=OH), and mixtures thereof.

The pentate salts of amino-s-triazines are readily prepared by first hydrolyzing a pentate compound such as dichloropentate to provide the free acid, then reacting that product with the requisite amount of the amino-s-triazine to form the sparingly soluble salt. For example, the dichloropentate is first hydrolyzed by warming with aqueous alkali. This product is then added to a warm aqueous solution of the amino-s-triazine containing sufficient mineral acid to dissolve the triazine. The sparingly soluble pentate salt precipitates from the solution as a fine powder or crystalline compound. As an alternative, an acid acceptor such as a tertiary amine may be employed in place of the alkali to promote the hydrolysis reaction. As a third alternative, the amino-s-triazine may be added to the aqueous mixture prior to hydrolysis, whereupon the pentate salt is formed and precipitates as the hydrolysis proceeds. The preparation of pentate salts of amino-s-triazines is more fully described in U.S. Pat. No. 4,154,930.

The amount of flame retardant pentate salt employed will be from about 20 to about 50 wt. percent of the total composition. The pentate salts may be employed alone or, more preferably together with a polyol such as for example pentaerythritol, dipentaerythritol or tripentaerythritol to aid in forming char.

The compositions of this invention are flame retardant and intumescent, forming upon combustion a tough, non-burning foamed char surface layer which insulates and protects the substrate from further burning. The char layer additionally appears to prevent dripping of molten resin during combustion.

The compounding of the thermoplastic polyurethane elastomer with the flame retardant pentate salt may be carried out in any of the conventional compounding processes including Banbury mixing, powder mixing, melt extrusion of the polyurethane elastomer and the flame retardant components, milling the components together on a roll mill and the like. The composition may further include such additives as plasticizers, heat and light stabilizers, antioxidants, pigments, dyes and the like as is commonly practiced in the compounding art.

The following examples are provided to illustrate the practice of this invention.

EXAMPLES 1-4

In the following Examples, summarized in Table I, compositions containing polyurethane elastomer and varying levels of melammonium pentate and dipentaerythritol were prepared and tested.

The flame testing was carried out by Underwriters Laboratory Test method UL 94, vertical Burn Method. The Limiting Oxygen Index test method or LOI, described in ASTM 2863-74, is a further method for rating flammability. The flammability decreases with increase in LOI value.

The compounding was carried out by first dry-mixing the additive components with the polyurethane elastomer then melt-mixing the composition using a Brabender mixing head fitted with rollerblades for 5 min. at 80 rpm. The blend was then compression-molded to form a slab, which was cut into test bars. The test data for the various compositions are summarized in Table I.

TABLE I

| Ex. No. | 1 | 2 | 3 | 4 |
|---|---|---|---|---|
| Component[1] | | | | |
| Polyurethane elastomer[2] | 100 | 100 | 100 | 100 |
| Melammonium pentate | — | 40 | 35 | 30 |
| Dipentaerythritol | — | 4 | 3.5 | 3 |
| FR Additive, WT. % | — | 27.8 | 25.3 | 22.6 |
| UL Rating | V-2 | V-0 | V-0 | V-0 |
| LOI | 22.8 | 35.1 | 30.0 | 29.5 |

Notes:
[1]Components of formulation in parts by weight
[2]Polyurethane elastomer obtained as Texin 591A from Mobay Chemical Corp.

It will be apparent that polyurethane elastomers are made flame retardant by the addition of as little as 23 wt. % melammonium pentate. In Example 1, the composition containing no flame retardant additive exhibited extensive dripping of flaming molten material. The composition of Examples 2-4 were intumescent, self-extinguishing and non-dripping.

The invention will thus be seen to be compositions comprising a thermoplastic polyurethane elastomer and a flame-retarding amount of the pentate salt of an amino-s-triazine, said salt being selected from the group melammonium pentate, the pentate salt of ammelide and mixtures thereof, wherein the amount of said salt will be from about 20 to about 50 percent by weight of the total composition, and a method for rendering thermoplastic urethane elastomers intumescent, non-dripping and self-extinguishing.

Further modifications including the use of dyes, pigments, fillers, stabilizers and the like will be apparent to those skilled in the art, and such additives and modifications may be made without departing from the spirit and scope of the invention, which is defined solely by the following claims.

I claim:

1. Thermoplastic polyurethane elastomer compositions comprising (a) a thermoplastic polyurethane elastomer, (b) a flame retarding amount of an intumescent additive selected from the group consisting of melammonium pentate, the pentate salt of ammelide, and mixtures thereof, and (c) a polyol.

2. The composition of claim 1 wherein the intumescent additive is present in from about 20 to about 50 percent by weight of the total composition.

3. The composition of claim 1 wherein said additive is melammonium pentate.

4. The composition of claim 1 wherein said additive is melammonium pentate and the polyol is dipentaerythritol.

5. A method for rendering thermoplastic polyurethane elastomers intumescent and self-extinguishing consisting of compounding therewith from about 20 to about 50 percent by weight based on final composition of an additive selected from the group consisting of melammonium pentate, the pentate salt of ammelide and mixtures thereof, and a polyol selected from the group consisting of pentaerythritol, dipentaerythritol and tripentaerythritol.

* * * * *